Patented Dec. 2, 1930

1,783,417

UNITED STATES PATENT OFFICE

CHARLES B. DURGIN AND ARTHUR B. GERBER, OF ANNISTON, ALABAMA, AND PAUL LOGUE, OF ST. LOUIS, MISSOURI, ASSIGNORS, BY MESNE ASSIGNMENTS, TO SWANN RESEARCH, INC., OF BIRMINGHAM, ALABAMA, A CORPORATION OF ALABAMA

WHITE ANHYDROUS CALCIUM SULPHATE AND METHOD FOR PRODUCING SAME

No Drawing.    Application filed January 21, 1926.   Serial No. 82,877.

This invention relates to a method of producing anhydrous calcium sulphate by preventing discoloration during the calcining operation.

It has for its object the production on a commercial scale of a whiter anhydrous calcium sulphate than has been heretofore available on the market.

Anhydrous calcium sulphate is used extensively as a polishing agent in dentifrices and for similar purposes where a mild abrasive is required. For such uses the trade desires a pure white product. Anhydrous calcium sulphate is produced for the purposes above mentioned, either from selected natural gypsum or synthetic gypsum which is prepared by the interaction of lime and sulfuric acid. Both of these products have to be calcined to remove water of crystallization before becoming suitable for the uses mentioned.

The method of production of calcium sulphate from a mixture of lime and sulfuric acid is well known. Likewise, the use of synthetic calcium sulphate in the production of anhydrous calcium sulphate is well known, where the calcium sulphate is obtained by the reaction between sulfuric acid and calcium salts, such, for instance, as calcium phosphate. It is also well known that selected natural gypsum may be calcined and a fairly white product obtained; but the color of all anhydrous calcium sulphate now on the market is unsatisfactory for uses where material with a pure white appearance is desired.

It is commonly known that when natural gypsum, or synthetic calcium sulphate, is calcined to remove completely the water of crystallization, the resultant product is not pure white in color. The tendency is towards a pinkish tinge. Numerous experiments investigating the cause of the pinkish color in calcined anhydrous calcium sulphate indicate the presence of iron as the principal cause of discoloration. We propose adding a substance to the calcium sulphate prior to calcination, whereby the impurities which cause the discoloration are converted into another form and we thus prevent the discoloration of the material. We have observed that this prevention of discoloration is obtained by the use of a phosphate salt, such as mono calcium, di-calcium phosphate, mono sodium phosphate, pyro sodium phosphate, mono ammonium phosphate, when such a phosphate salt is mixed with the dried calcium sulphate before calcination. In addition to the above mentioned substance, numerous other materials, such as sodium chloride, potassium phosphates, and calcium chloride have been tested, and as their results were more or less unsatisfactory we regard them as less suitable than a phosphate salt. As a result of these tests, we propose the use of a salt of phosphoric acid, preferably mono calcium phosphate, as an agent for preventing discoloration, whereby the color of anhydrous calcium sulphate will be improved over the color were the phosphate salt addition not used.

We propose using from 1% to 5% of a phosphate salt, preferably mono calcium phosphate, which is mixed with the dried calcium sulphate prior to calcination. In the case where natural ground gypsum is used, it is satisfactory to have it pulverized to about 65 to 100 mesh, and since the synthetic calcium sulphate will be much finer it is unnecessary to grind it except to disintegrate any large aggregates of the small particles which may have become agglomerated. Any convenient type of mixer is suitable for the thorough mixing of the mono calcium phosphate with the calcium sulphate. After the materials are thoroughly mixed, the mass is placed in a suitable calcining furnace which may be heated by oil, gas, or electric current, and the temperature raised to approximately 1400° F. At this temperature the water of crystallization is driven off from the gypsum or synthetic calcium sulphate, and the presence of the phosphate salt prevents the discoloration of the resultant anhydrous calcium sulphate. After a suitable period in the furnace where the mixture is maintained at the necessary temperature to form anhydrous calcium sulphate, the mass is discharged from the furnace, cooled and passed through a disintegrator where any lumps are broken up. In case the material is desired within a specified range of sized particles, it becomes necessary to screen the disintegrated anhydrous calcium sulphate and any type of standard screen may be used for this purpose.

While we are aware, to a reasonable degree, the prevention of discoloration of anhydrous calcium sulphate may be accomplished by other substances than a phosphate salt, there are objections to the use of such materials, and we have found, considering the ease of mixing its component elements and calcining, and the physical condition of the final product, that a phosphate salt, preferably mono calcium phosphate, is the most satisfactory substance for preventing discoloration.

Having thus described our invention, what we claim as new and desire to secure by Letters Patent, is:—

1. A method for producing white anhydrous calcium sulphate, which consists in adding calcium phosphate to hydrated calcium sulphate, and heating the mixture to produce anhydrous calcium sulphate, substantially as described.

2. A method for improving the color of anhydrous calcium sulphate, which consists in adding from 1% to 5% of calcium phosphate to hydrated calcium sulphate; and heating the mixture to produce anhydrous calcium sulphate, substantially as described.

3. A method for the production of white anhydrous calcium sulphate, which consists in adding calcium phosphate to hydrated calcium sulphate, and heating the mixture to approximately 1400° F. to produce anhydrous calcium sulphate, substantially as described.

4. A method for the production of white anhydrous calcium sulphate, which consists in adding mono calcium phosphate to hydrated calcium sulphate, and heating the mixture to produce anhydrous calcium sulphate, substantially as described.

5. A method for the production of white anhydrous calcium sulphate, which consists in adding not exceeding 5% finely ground mono calcium phosphate to hydrated calcium sulphate, thoroughly incorporating said mono calcium phosphate with said hydrated calcium sulphate, and heating said mixture to approximately 1400° F. to produce anhydrous calcium sulphate, substantially as described.

6. As a new article of manufacture, a white anhydrous calcium sulphate containing calcium phosphate.

7. As a new article of manufacture, a white anhydrous calcium sulphate containing calcium phosphate not substantially in excess of 5% of the mixture.

8. A method for producing white anhydrous calcium sulphate, which consists in adding from 1% to 5% of mono-calcium phosphate to hydrated calcium sulphate, and heating the mixture to produce anhydrous calcium sulphate, substantially as described.

9. A method for the production of white anhydrous calcium sulphate, which consists in adding mono-calcium phosphate to hydrated calcium sulphate, and heating the mixture to approximately 1400° F. to produce anhydrous calcium sulphate, substantially as described.

In testimony whereof we affix our signatures.

CHARLES B. DURGIN.
ARTHUR B. GERBER.
PAUL LOGUE.